United States Patent [19]

Allin et al.

[11] Patent Number: 4,928,303
[45] Date of Patent: May 22, 1990

[54] CABLING SYSTEM FOR LOW VOLTAGE AND VERY LOW VOLTAGE NETWORKS IN A BUILDING

[76] Inventors: Jean-Claude Allin, 102, rue Claude Benard, 95610 Eragny; Jacques Nozick, 28, rue Broca, 75005 Paris, both of France

[21] Appl. No.: 291,897

[22] Filed: Dec. 29, 1988

[30] Foreign Application Priority Data

Dec. 29, 1987 [FR] France .................. 87 18267

[51] Int. Cl.$^5$ ..................... H04M 11/00; H01R 11/00
[52] U.S. Cl. ...................... 379/93; 379/397;
379/90; 439/502; 439/507; 439/142; 439/716
[58] Field of Search ............... 379/332, 397, 442, 90, 379/93; 439/142, 149, 502, 505, 716, 668, 676, 689

[56] References Cited

U.S. PATENT DOCUMENTS

| | | | |
|---|---|---|---|
| 4,146,287 | 3/1979 | Jonsson | 439/502 |
| 4,575,169 | 3/1986 | Duplatre et al. | 439/142 |
| 4,613,194 | 9/1986 | Pohl | 439/507 |
| 4,761,811 | 8/1988 | Zelena, Jr. | 379/90 |

FOREIGN PATENT DOCUMENTS 8801459 2/1988 World Int. Prop. O. ............ 379/93

*Primary Examiner*—P. Austin Bradley
*Attorney, Agent, or Firm*—Sughrue, Mion, Zinn, Macpeak & Seas

[57] ABSTRACT

In a building subdivided into work stations (A1, A2) each work station is provided with at least one low voltage power supply outlet (12), at least one telephone socket (11), and at least one computer socket (10). The low voltage power supply outlet (12) is connected to a low voltage power supply bus (30). The telephone socket and the computer socket are portions of a precabling element which further includes a cable (1) having at least two pairs of wires for respectively establishing a telephone link and a computer link, and also having a connection module (2) at its other end. The entire precabling element (1, 2, 10, 11) is factory manufactured, thereby enabling any type of building to be cabled in a manner which is systematic, unspecialized, and reconfigurable.

10 Claims, 2 Drawing Sheets

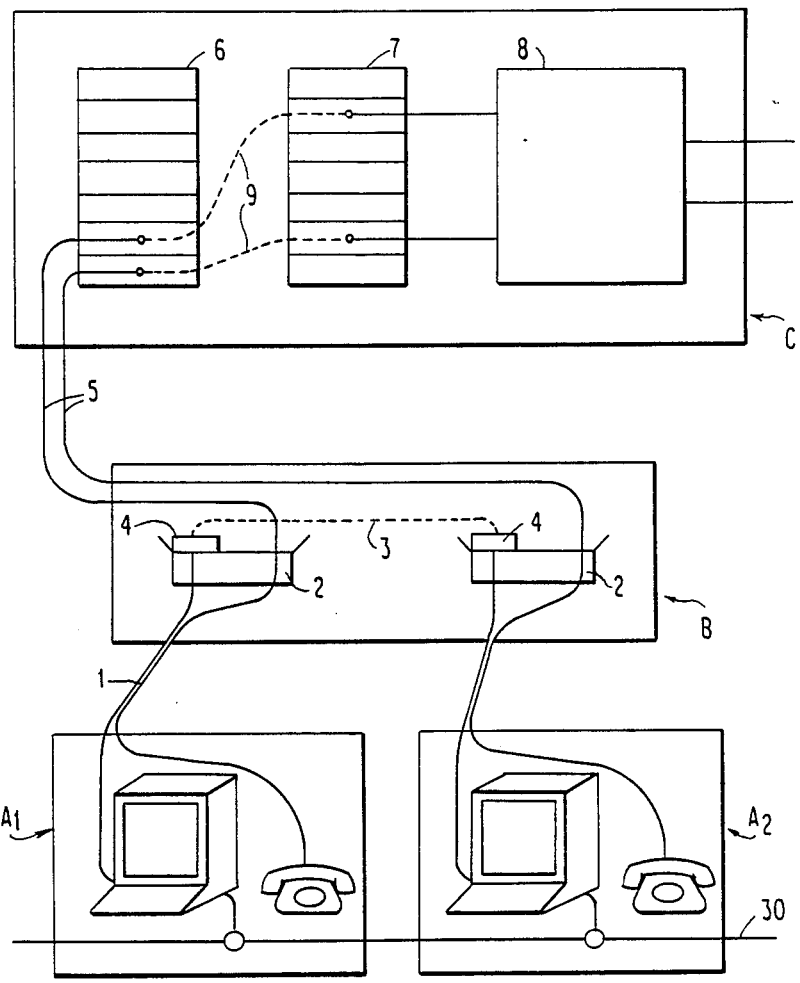
FIG.1
FIG.3
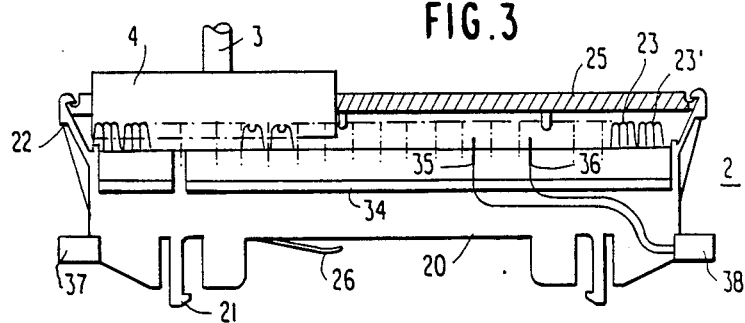
FIG.5
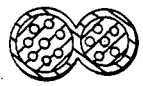
FIG.4
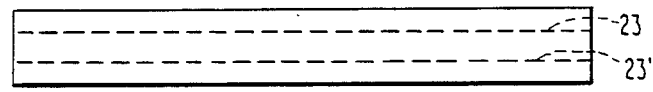

CABLING SYSTEM FOR LOW VOLTAGE AND VERY LOW VOLTAGE NETWORKS IN A BUILDING

The present invention relates to a precabling element for low voltage and very low voltage networks in a building.

BACKGROUND OF THE INVENTION

When a building is built or renovated, and in particular a building for professional use, it is advantageous to provide it with precabled networks (low voltage power supply network for powering electrical apparatus, lighting, etc.; very low voltage networks for telephone and computer links) which precabled networks should be simultaneously "systematic", "unspecialized", and "reconfigurable". A precabled network is said to be "systematic" when each work station within a building or a zone of a building that has been divided up into a plurality of potential work stations is provided with a suitable number of possible connections. A precabled network is said to be "unspecialized" when all of the cables it uses are identical and suitable for establishing any type of link. Finally, a precabled network is said to be "reconfigurable" when the connections and links that it makes possible can be modified at will without altering the actual structure of the network. Precabling systems for making networks of this type have numerous advantages over conventional cabling performed on a "blow-by-blow" basis as needs arise:

buildings can be adapted instantly to changes in the human organizations they contain;

there is no need for highly qualified personnel either to install them in the first place or to make proper use of them subsequently;

they are reliable, with the use of identical cables making it easier to check out a system thoroughly using a single test apparatus, and faulty items can be replaced by being interchanged with working items; and they are cheap since the extra cost incurred of installation compared with conventional cabling is minimal and is rapidly compensated by the low cost that such cabling requires for extensions and adaptations to meet new requirements.

A systematic, unspecialized, and reconfigurable cabling system for a very low voltage telephone and/or computer network in a building is described in published French patent number 2 609 218. According to this publication, in a building which is subdivided into a plurality of work stations, each work station is connected by at least one precabling element to a subsidiary distribution premises. The subsidiary distribution premises contains at least two subsidiary distribution frames (one being for telephone links and the other for computer links), thereby enabling any work station to be connected to any other work station. A subsidiary distribution frame comprises an assembly of connection modules each containing a plurality of pairs of contacts. All of the precabling elements are identical and are constituted by a cable comprising a plurality of pairs of wires connected at one of its ends to a module disposed in the subsidiary distribution premises where the wires are connected to the modules of the two different subsidiary distribution frames. The other end of the precabling element is connected to a contact strip, which strip includes at least as many contacts as the cable has wires.

The end of the precabling element which is connected to the contact strip is disposed in a work station where it is suitable for being connected via the contacts of said strip to electrical terminations (e.g. sockets for computer purposes or telephone purposes, etc.). According to said prior patent publication. a building may be subdivided into a plurality of zones each served by a corresponding subsidiary distribution premises. In this case, the subsidiary distribution frames of the various zones are interconnected by cables referred to as "trunks".

The cabling system whose characteristics have been briefly outlined above is thus suitable for providing a building with a very low voltage network which is systematic, unspecialized, and reconfigurable. Unfortunately, it is not exactly suited to present requirements since it is only capable of equipping work stations in part since they also require a low voltage (i.e. mains) power supply. Further, considerable manpower is required to install the system since the precabling elements used must be adjusted in length and connected at both ends, firstly to electrical terminations (e.g. sockets for computers and telephones) and secondly to the connection modules of a subsidiary distribution frame. Making connections to a distribution frame of any kind is not particularly simple, and the above-mentioned patent specification specifies that each subsidiary distribution premises contains two distribution frames, one for telephone purposes and the other for computer purposes.

The object of the present invention is to improve prior art cabling systems of the type mentioned above. The present invention seeks to provide a precabling system for the low voltage network and for the very low voltage network of a building, said system including, in particular, precabling elements which can be completely manufactured in a factory, ready for use.

The invention provides for a cabling system both for the very low voltage telephone and computer network and for the low voltage power supply network of a building subdivided into work stations in which each work station is provided with at least one low voltage power supply outlet connected to a low voltage power supply bus, at least one telephone socket, and at least one computer socket, with it being possible to establish a telephone link between any two work stations via a subsidiary distribution frame, a main telephone distribution frame, and an automatic exchange, with it being possible to establish a computer link between any two work stations and/or between any work station and a central service (e.g. a mainframe computer) via at least one subsidiary distribution frame, with the same subsidiary distribution frame being used for establishing both telephone links and computer links between any two work stations.

SUMMARY OF THE INVENTION

The present invention provides a telephone and computer precabling element comprising:

a cable including at least one pair of wires for establishing a telephone link and at least one pair of wires for establishing a computer link;

at least one socket for connection to telephone equipment and at least one socket for connection to computer equipment, said sockets being connected to one end of the corresponding pairs of wires in the cable; and a connection module including at least as many pairs of contacts as the cable has pairs of wires, with said pairs of computer wires and said pairs of telephone wires being connected to contacts in the same module.

According to the invention, each work station in a building is connected to the subsidiary distribution frame serving it by means of such a precabling element which is fully manufactured in a factory and which is installed without making connections. A subsidiary distribution frame is constituted by a collection of the modules.

BRIEF DESCRIPTION OF THE DRAWINGS

An embodiment of the invention is described by way of example with reference to the accompanying drawings, in which:

FIG. 1 is a diagram of the very low voltage cabling in a zone of a building which is subdivided into work stations;

FIG. 3 is a plan view in partial section through a module forming a portion of a precabling element in accordance with the invention;

FIG. 4 is a diagrammatic elevation view of the FIG. 3 module; and

FIG. 5 is a section through an example of a cable connecting a work station to a module (cable 1 in FIG. 1).

MORE DETAILED DESCRIPTION

Figure 2:
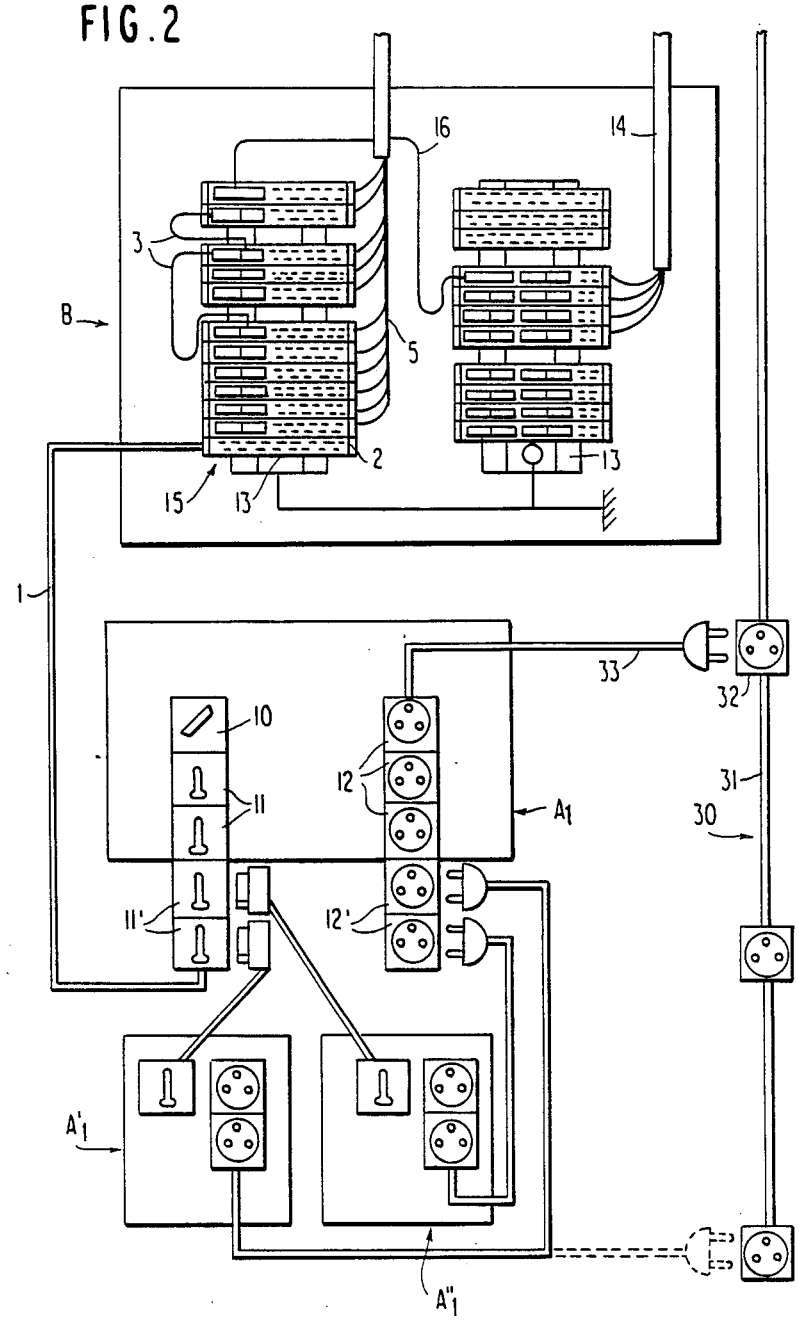
FIG. 2 is a diagram of the low voltage cabling and of the very low voltage cabling in a work station.

FIG. 1 is a diagram showing the very low voltage cabling in a zone of a building, e.g. a floor, which is subdivided into a plurality of work stations A1, A2 which are served by a common subsidiary distribution premises B or by a common central service (e.g. a mainframe computer). In this diagram, equipment which is concentrated in a common location (work station A1 or A2, subsidiary distribution premises B, telephone exchange C) is shown within a common box drawn in heavy lines, while fixed links are drawn as continuous fine lines and removeable links are drawn as dashed fine lines.

According to the invention, a precabling element is run between each work station A1, A2 and the corresponding central service or subsidiary distribution premises B, with each precabling element comprising a cable 1 which is connected at one end to electrical terminations (e.g. sockets for connection to various items of equipment (such as a microcomputer and a telephone set as shown in the figure), while its opposite end is connected to a connection module 2. The component parts of such a precabling element are described in greater detail below, and the important feature is that the precabling element is fully assembled in a factory. The length of cable 1 connecting the various sockets to the connection module 2 is therefore not adjusted to the exact path length between each work station A1, A2 and the corresponding subsidiary distribution premises B. However, precabling elements may be manufactured in various different lengths (e.g. 10, 15, 20, etc., meters) in which case, on any given cable path, the user merely needs to install he appropriate precabling element whose length is immediately longer than said path, with excess cable being wound down in the vicinity of the work station. Such complete prefabrication of the precabling elements provides a considerable saving in on-site labor, i.e. a considerable reduction in cost compared with the cost of installing a prior art system. The cable may advantageously be constituted by a pair of cables as shown in section in FIG. 5, with the two cables of the pair being glued together and capable of being torn apart. One or other of the two cables may be screened, and the two cables may be identical or different. Each individual cable includes a plurality of pairs.

The modules 2 are brought together in the subsidiary distribution premises B and, optionally, in central service premises in order to form compact assemblies referred to herein as subsidiary distribution frames (reference numeral 15 in FIG. 2). According to a feature of the invention, such modules are multipurpose and are connected both to telephone wire pairs and to computer wire pairs. The computer contacts of two modules 2 may be interconnected by an interconnection cord 3 having an appropriate connector 4 at each of its ends, thereby enabling a computer link to be established between any two work stations. The telephone contacts of each module are connected by means of fixed pairs of wires 5 to first modules 6 of a common telephone distribution frame situated in a telephone exchange C. In the exchange, a set of second modules 7 is connected in permanent manner to an automatic switching unit 8. Arbitrary links may be established between any module 6 and any module 7 by means of interconnection cords 9 referred to as "jumpers".

FIG. 2 shows a portion of FIG. 1 on a larger scale, said portion comprising a single work station A1 and the central service or subsidiary distribution premises B to which it is connected. The work station A1 typically includes a computer socket 10, two telephone sockets 11, and three low voltage power sockets 12, with at least one of them being designed to power a computer (i.e. at least one of them is provided with a ground contact). The work station A1 may also include two additional telephone sockets 11' for use in satellite work stations A1' and A1'. The telephone sockets 11 and 11' and the computer socket 10 are connected to one end of a cable 1 containing the corresponding number of pairs of wires (i.e. five pairs in this case). The pairs of telephone wires are screened to prevent ringing current from interferring with the computer connections. The other end of the cable 1 is connected to a multipurpose connection module 2 comprising a first series of contacts for computer connections only, and a second series of contacts for telephone connections only. In the context of the present invention, the assembly constituted by the computer socket 10, the telephone sockets 11 and 11', the cable 1, and the module 2 constitutes a single precabling element which is completely manufactured and tested in a factory. It should be observed that such prefabrication is made possible by the use of modules 2 which are multipurpose.

The subsidiary distribution premises B includes a subsidiary distribution frame 15 built up by bringing together a variable number of connection modules. The modules are fixed, advantageously by snap-fastening, to at least one supporting metal rail 13 which is grounded. FIG. 2 shows two rails 13. The lefthand rail in the figure supports the modules 2 of the precabling elements (for reasons of clarity, only the cable 1 serving work station A1 has been shown). Telephone wire pairs 5 running from the distribution frame of the telephone exchange are connected to the modules 2. The computer termination sockets of the various work stations may be connected to one another at the subsidiary distribution frame 15. For example, FIG. 2 shows two interconnection cords 3 each providing a single computer connection between a corresponding pair of modules. The righthand rail in the figure has several groups of modules fixed thereto, with the modules in the center group being used for establishing computer links between two different subsidiary distribution frame premises B. This group of relay modules is connected by means of a "trunk" cable 14 to a corresponding group of modules situated in another subsidiary distribution frame or in a central service (e.g. a mainframe computer room). By way of example, an interconnection cord 16 is shown connecting one of the precabling element modules 2 to a relay module fixed on the righthand rail.

The work stations are fed with low voltage power by means of a power supply bus 30 including a cable 31 having outlets 32 connected thereto at regular intervals. Extensions 33 including the power supply outlets 12 in each work station are connected to these bus outlets 32. Just like the computer and telephone precabling elements, the bus 30 is factory made and is laid when the building is built or renovated in such a manner as to serve all potential work stations.

FIG. 3 shows a multipurpose module 2 for a precabling element of the invention. This module comprises a body 20 made of plastic material including snap-fastening lugs 21 for fixing to a metal rail 13 which advantageously includes a conducting track on its front face. The body 20 has two parallel rows of cells for receiving contacts 23, 23' which are advantageously staggered and which are connected to the cable 1 of a precabling element. All of the cells are of the same size, but they may receive contacts of different shapes depending, in particular, on the sections of the wires to be connected thereto (the figure shows contacts having two teeth and contacts having three teeth). The staggered disposition increases the isolation distance (high data rate contacts). These contacts are divided into two series, with the first series being used for connecting the pairs of wires of the telephone link and with the second series being used for connecting the wires of the computer link. This second series of contacts may also have one or more connectors connected thereto constituting parts of one or more interconnection cords 3 (only one connector 4 is shown in FIG. 3; in FIG. 2, several of the modules of the distribution frame 15 are shown as being provided with two connectors). The interconnection cord may leave the connector perpendicularly as shown in the figure, or else it may leave tangentially. The contacts of the first series are additionally connected to telephone pairs connecting the module to the common telephone distribution frame C. Since these telephone wire pairs (referenced 5 in FIGS. 1 and 2) are fixed, and also to prevent a connector 4 from being connected to contacts reserved for telephone links, each module 2 is provided with a protection member preventing access to the telephone contacts. This protection member is constituted essentially by a shutter comprising one or more plates having substantially the same width as the module 2 and covering a plurality of the contacts, said shutter being snap-fastened to the sides of the module which are appropriately shaped. Protection can thus be provided by a single shutter plate 25 extending over the entire length of the module and including a hole whose shape corresponds to that of a connector 4 at the end of an interconnection cord. The plate is fixed to the module 2 by snap-fastening, with the body 20 of the module including two outwardly projecting arms 22 provided for this purpose. These removeable shutters prevent digital connectors being connected by mistake and prevent unwanted line mixing with the attendant risk of excess voltages from an analog line being applied to a digital line. If the shutter is removed, an analog line can be transformed into a digital line, i.e. made accessible to a connector. The analog lines are hard wired. Advantageously, the module includes wire-passing guides 37 and 38 at each end. Each of these guides brings together all of the wires arriving on one face. One of the faces receives wires coming from a work station while the other face receives wires going to the distribution frame of the exchange. At least one face of the module may be formed with a wire-passing guide 34 constituted by a longitudinal rib having a hole facing each contact. This makes it possible to comb the cable in order to have a visible and ordered arrangement of wires, as shown for two wires 35 and 36 in FIG. 3. In addition to the digital contacts for computer purposes and the analog contacts for telephone purposes, the module may include additional pairs of contacts for special purposes: remote control; remote power supplies; etc. . . .

With this system, analog telephone connections can be transformed into digital connections without modifying the installation. The front face of the module may receive a label identifying its work station.

Interference current (due, in particular, to static electricity) is removed from each module 2 by means of a screen drain constituted by a flexible metal blade 26 fixed to the rear of the module body 20 and coming into contact with the grounded rail 13 when the module is snap-fastened on the rail. The blade is connected to the ground drain of the cable.

The present invention is not limited to the embodiment described above. On the contrary, it may be modified and varied by the person skilled in the art.

We claim:

1. A telephone and computer precabling element comprising:
   a cable including at least one pair of wires for establishing a telephone link and at least one pair of wires for establishing a computer link;
   at least one socket for connection to telephone equipment and at least one socket for connection to computer equipment, said sockets being connected to one end of the corresponding pairs of wires in the cable; and
   a connection module including at least as many pairs of contacts as the cable has pairs of wires, with said pairs of computer wires and said pairs of telephone wires being connected to contacts in the same module.

2. A precabling element according to claim 1, wherein the module of a precabling element includes at least two different kinds of contact for connection to wires of at least two different sections.

3. A precabling cabling according to claim 1, wherein the connection module includes a removable protection member preventing access to the contacts which are connected to telephone link wires.

4. A precabling element according to claim 1, wherein the connection module includes a screen drain contact for the cable, said contact being constituted by a flexible metal blade for making contact with a metal structure connected to ground, said contact being fixed independently on the plastic of the module and being connected to the ground drain of the cable.

5. A precabling element according to claim 1, wherein the module includes wide wire-passing guides and at each end thereof and a wire-passing guide on at least one face and constituted by a rib having a hole facing each contact.

6. A precabling element according to claim 1, wherein the contacts of the modules are disposed in a staggered configuration.

7. A precabling element according to claim 1, wherein the cable is constituted by a pair of cables comprising two glued-together cables capable of being torn apart.

8. A precabling element according to claim 7, wherein one of two cables is screened.

9. A building including a plurality of work stations and a subsidiary distribution premises, with each work station being connected to the subsidiary distribution premises by means of a precabling element of claim 1, the connection modules being brought together in said premises in order to constitute the subsidiary distribution frame.

10. A building according to claim 9, wherein each work station further includes at least one low voltage power supply outlet connected to a low voltage power supply bus.

* * * * *